United States Patent [19]

Pipkin et al.

[11] Patent Number: 4,768,040

[45] Date of Patent: Aug. 30, 1988

[54] HAND-HELD MARKING DEVICE IN COMBINATION WITH A COUNTER

[76] Inventors: David J. Pipkin, 2323 Selby Ave., Los Angeles, Calif. 90067; John S. Marzich, 2808 Fisk La., Redondo Beach, Calif. 90278

[21] Appl. No.: 925,005

[22] Filed: Oct. 29, 1986

[51] Int. Cl.[4] ........................ G01D 9/00; G01D 15/16; B43K 29/00

[52] U.S. Cl. .................................. 346/14 R; 346/143; 401/195; 377/1

[58] Field of Search ....................... 377/1; 346/14, 143; 401/194, 195

[56] References Cited

U.S. PATENT DOCUMENTS

| | | | |
|---|---|---|---|
| 3,064,888 | 11/1962 | Van de Mark | 346/14 X |
| 3,120,924 | 2/1964 | Van de Mark | 346/14 |
| 4,466,742 | 8/1984 | Lemelson | 346/143 X |

*Primary Examiner*—E. A. Goldberg
*Assistant Examiner*—Mark Reinhart
*Attorney, Agent, or Firm*—W. Edward Johansen

[57] ABSTRACT

The present invention is a marking device which is hand-held and which a user uses to mark in order to count each of a plurality of items in a set and to automatically record the count. As the hand-held marking device counts each of the items, it simultaneously displays the number of the items counted. The hand-held marking device includes a cartridge and a transducer both of which are mechanically coupled to a casing. The cartridge is replaceable and has a marking tip for marking off items at one end and a plunger at the other end. The transducer has a contact-trigger. The cartridge is slideably coupled within the casing so that when its marking tip contacts any surface, its plunger engages the contact-trigger of the transducer thereby producing an input pulse. The hand-held marking device also includes a counting and displaying system, a reset switch and a display. The counting and displaying system is electrically coupled to the transducer and counts the number of marked items in response to a like number of input pulses and stores the number of counted items. Both the display and the reset switch are electrically coupled to the counting and displaying system. The user presses the reset switch when he has completed marking and counting in order to reset the counting and displaying system.

4 Claims, 1 Drawing Sheet

AMP.
Display
D/A
Converter
Counter
reset
Latch
reset
10
11
12
13
14
15
16
17
18
19
20
21
22
23
24
25
26
27
28
29

HAND-HELD MARKING DEVICE IN COMBINATION WITH A COUNTER

BACKGROUND OF THE INVENTION

1. Field of the Invention

The present invention relates to a hand-held marking device for marking in order to count each of a plurality of items in a set and more particularly a hand-held marking device which has a counting and displaying system for counting the items and displaying the number of counted items.

2. Description of the Prior Art

U.S. Pat. No. 3,064,888, entitled Counting Marker, issued to Robert L. Van de Mark on Nov. 20, 1962, teaches a counting marker which includes an elongated tubular casing and an elongated marking element with the elongated tubular casing. When marking pressure is applied to the counting marker it mechanically closes a pair of contacts thereby causing an electronic circuit to advance the count in a counter. U.S. Pat. No. 3,120,924, entitled Combined Marking and Counting Instrument, issued to Robert L. Van de Mark on Feb. 11, 1964, teaches a combined marking and counting instrument.

U.S. Pat. No. 4,128,889, entitled Pen Type Electronic Digital Calculator, issued to Shin Ojima, Kazuhiko Ohgami, Kazutaka Watanabe, Masaru Nohara and Kenji Yamamoto on Dec. 5, 1978, teaches a pen type electronic digital calculator which has a barrel, a writing implement which is mechanically coupled to the barrel, a microprocessor disposed within the barrel and a display, input keys and an on/off switch which are electrically coupled to the microprocessor. The input keys are arranged in three rows on one-half part of the barrel in its lengthwise direction. When the three rows of keys are held substantially horizontal, the top surface of each key of the central row is higher than the top surfaces of the keys of the other row. The keys of the respective rows are mounted so that they are longitudinally spaced from the keys of the adjacent rows. Each key is disposed at the center of a recess formed in the barrel.

U.S. Pat. No. 4,466,742, entitled Electronic Digital Watch, issued to Jerome H. Lemelson on Aug. 21, 1984, teaches a writing implement which contains an electronic computer for computing and displaying time. The implement includes an elongated barrel with a writing element having a tip which protrudes from one end thereof and an electronic time signal generating device which is defined by a narrow elongated support having a circuit board disposed within the barrel and containing display elements which extend in a row longitudinally of the barrel of the implement which display is aligned behind an elongated window which extends across a longitudinally extending opening in the wall of the barrel. Structures are provided for easily removing a battery with respect to the barrel in order to arrange it in circuit with the electronic circuit which is supported by the circuit board. Structures are also provided for easily removing the circuit board from and repairing or replacing it with another circuit board.

U.S. Pat. No. 4,518,274, entitled Pen with Built-in Illumination, issued to Rolf Hanggi on May 21, 1985, teaches a writing implement having a built-in illumination which includes a barrel which dimensioned in order to contain a small battery in contact with one of the terminal of a lightbulb which is held in place axially in the barrel by a corrugated metal bulb holder and by a translucent spacer which extends to the end of the barrel where a marking element is located and opposite the end disposed to contain the battery. A metal spring-clip has a sliding portion which is mounted externally to the wall of the barrel and is disposed in a manner in order to make electrical contact with the battery therein. The sliding portion is free to slide down the exterior of the wall of the barrel and to make contact with the bulb holder through a hole in the wall of the barrel thereby completing the circuit between the lightbulb and the battery using the length of the spring-clip as a primary conductive element in the system.

U.S. Pat. No. 3,738,037, entitled Tubular Assembly having Indicia Displaying Means, issued to Erika Daley on June 12, 1973, teaches a tubular assembly having an inner shell which is provided with indicia in the form of English-Metric equivalent units of weights and measures and which is arranged in circumferenctially spaced, longitudinal rows on the outer surface of the shell. A sleeve is mounted about the shell for rotation relative thereto and is provided with a longitudinal row of windows which register with a selected row of indicia which are carried by the shell. Lenses are carried by the sleeve for magnifying the image produced by the indicia on the shell and displayed through the windows of the sleeve.

U.S. Pat. No. 4,157,874, entitled Dye Marking Device, issued to David Durand on June 12, 1979, teaches a marking device wherein a pen-type device is utilized to store and enable markings to be produced from a dye which is suspended in a suspension medium such as water. The dye is of the heat sublimatible type and is finely ground. The dye is maintained in suspension by the rolling action of a ball trapped within a reservoir defined by the barrel. A primary chamber is positioned adjacent the reservoir and a porous marking element is in turn frictionally and slidably positioned in the primary chamber. A valve which is normally urged to a closed position enables ink to move from the reservoir into the primary chamber when the valve is caused to open as by pressure against the marking element.

U.S. Pat. No. 4,585,364, entitled Ball Pen Combined with Electronic Watch, issued to Dar-Kuei Liaw on Apr. 29, 1986, teaches a ball pen which is combined with an electronic watch.

U.S. Pat. No. 4,600,327, entitled Writing Pen with Correction Fluid Reservoir, issued to Joe O. Guzman on July 15, 1986, teaches a writing instrument which combines an ink applicator with a correction fluid reservoir.

SUMMARY OF THE INVENTION

In view of the foregoing factors and conditions which are characteristic of the prior art it is the primary object of the present invention to provide a hand-held marking device which a user uses to mark in order to count each of a plurality of items such as electrical outlets on engineering drawings and which includes a counting and displaying system for automatically counting the items and displaying the number of counted items.

It is another object of the present invention to provide a hand-held marking device which also provides an audio signal which will sound with each mark to signal that the mark has been recorded.

In accordance with the preferred embodiment of the present invention a hand-held marking device which a user uses to mark in order to count each of a plurality of items in a set and to automatically record the count is described. As the hand-held marking device counts each of the items, it simultaneously displays the number of the items counted. The hand-held marking device includes a cartridge and a tranducer both of which are mechanically coupled to a casing. The cartridge is replaceable and has a marking tip for marking off items at one end and a plunger at the other end. The transducer has a contact-trigger. The cartridge is slideably coupled within the casing so that when its marking tip contacts any surface, its plunger engages the contact-trigger of the transducer thereby producing an input pulse. The hand-held marking device also includes a counting and displaying system, a reset switch and a display. The counting and displaying system is electrically coupled to the transducer and counts the number of marked items in response to a like number of input pulses and stores the number of counted items. Both the display and the reset switch are electrically coupled to the counting and displaying system. The user presses the reset switch when he has completed marking and counting in order to reset the counting and displaying system.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figures 1, 2, 3, 4:
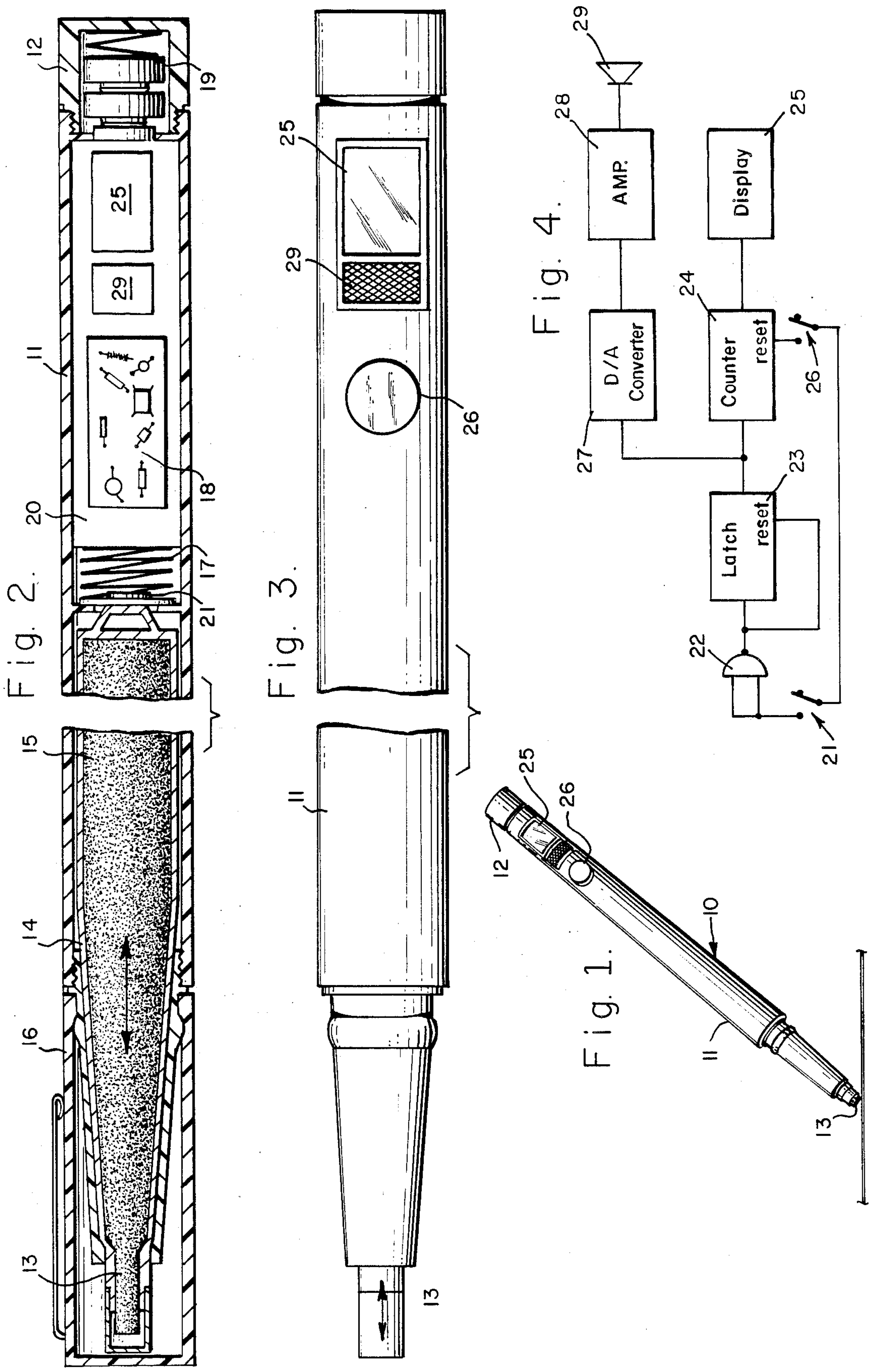
FIG. 1 is a perspective drawing of a hand-held marking device which not only a user uses for marking in order to count each of a plurality of items but which also has a counting and displaying system for counting each of the items and displaying the number of counted items while being being constructed in accordance with principles of the preferred embodiment of the present invention.
FIG. 2 is a partial longitudinal side view in cross-section of the hand-held marking device of FIG. 1.
FIG. 3 is a partial longitudinal side view of the hand-held marking device of FIG. 1.
FIG. 4 is a schematic drawing of the counting and displaying system of the hand-held marking device of FIG. 1.

In order to best understand the present invention it is necessary to refer to the following description of its preferred embodiment in conjunction with the accompanying drawing. Referring to FIG. 1 a user uses a hand-held marking device 10 for marking off in order to count each of a plurality of items in a set. The hand-held marking device 10 counts each of the items and automatically displays the number of the items counted. The hand-held marking device 10 includes a casing 11, a battery-holder 12 and a cartridge 13 which may be a pencil, a ball point pen, an ink pen or a felt-tip marker. U.S. Pat. No. 4,565,463, entitled Aqueous Ink Cartridge with Two Part Vent Plug, issued to Kunihiko Otaguro, Hiroshi Takahashi, Takashi Toyama, Takashi Ishikawa and Isao Ebisawa on Jan. 2, 1986, teaches a writing cartridge which may be projectably mounted in a casing of a writing instrument.

Referring to FIG. 2 the cartridge 13 is replaceable and is disposed in the casing 11. The cartridge 13 is filled with a marking medium, such as ink. The cartridge 13 has a marking tip 14 with a tip-cap **14*a* at one end and a plunger 15 at the other end opposite the marking tip 14. The tip-cap 14*a* is removable and covers the marking tip 14 in order to not only protect the marking tip 14, but also allow the hand-held marking device 10 to count without marking. A cover-cap 16 has a shirt-pocket clip 16*a* and snaps onto the casing 11 in order to cover the marking tip 14 of the cartridge 13** so that the ink will neither dry out nor leak out.

Referring to FIG. 2 in conjunction with FIG. 1 the hand-held marking device 10 also includes a transducer 17, a circuit board 18 both of which are disposed within and mechanically coupled to the casing 11, a battery 19 which is disposed within the battery-holder 12 and mechancally coupled to the circuit board 18, and a counting and displaying system 20 which is disposed on the circuit board 18, and in the preferred embodiment which is electrically coupled to the battery 19 in order to provide electrical power thereto. In other embodiments different power sources, including but not being limited to an array of solar-powered semiconductor-cells and an electrical outlet providing current, may be used for the same purpose.

Referring to FIG. 2 in conjunction with FIG. 1 and FIG. 3 the counting and displaying system 20 includes a counting circuit 21 which is mechanically coupled to the circuit board 18 and electrically coupled to the transducer 17 and a reset switch 22 which is mechanically coupled to the casing 11 and electrically coupled to the counting circuit 21. The user presses the reset switch 22 when he has completed marking and counting the items in order to reset the counting circuit 21. The counting and displaying circuit 20 also includes a display 23 and a speaker 24 both of which are mechanically coupled to the casing 11 and electrically coupled to the counting circuit 21. The counting circuit 21 counts the number of marked items in response to a like number of input pulses and displays the number of counted items on the display 23.

Referring to FIG. 2 the transducer 17 includes a first conductive plate 25, a first spring 26, a second spring 27 and a second conductive plate 28. The first conductive plate 25 is mechanically coupled to the casing 11. The first spring 27 is mechanically coupled both to the circuit board 18 and to the first conductive plate 25. The second spring 27 is coaxially disposed within the first spring 26 and mechanically coupled to the circuit board 18. The second conductive plate 28 is mechanically coupled to the second spring 27. The circuit board 18 has an input terminal 29 which is electrically coupled to the first spring 26 and an input pulse terminal 30 which is electrically coupled to the second spring 27. The input terminal 29 and the input pulse terminal 30 are electrically coupled to the counting and displaying system 20. The cartridge 13 is slideably coupled within the casing 11. When the marking tip **14*a* of the cartridge 13 contacts a surface the plunger 15 contacts the first conductive plate 25 of the transducer 17 causing the first conductive plate 25 to contact the second conductive plate 28 thereby transmitting an input pulse to the counting and displaying system 20. In another embodiment the transducer 17** may be a pressure sensitive switch which is electrically coupled between the input terminal 29 and the input pulse terminal 30 of the circuit board 18. When the user applies the marking tip 14 to a surface the plunger 15 activates the pressure sensitive switch.

Referring to FIG. 4 the input of the counting circuit 21 the input of which is a two-input nand gate 31 having two inputs of which are electrically coupled to the input terminal 29 of the counting and displaying system 20 and is electrically coupled to the input pulse terminal 30 through the input terminal 29 when the transducer 17 is in its closed position. The output of the two-input nand gate 31 is electrically coupled to the input of a latch 32. The output of the latch 32 is electrically coupled to the input of a counter 33. The output of the counter 33 is electrically coupled to the input of a display 23. The reset of the counter 33 is electrically coupled to a reset switch 22 which is electrically coupled to the input pulse terminal 30. The output of the latch 32 is also electrically coupled to the input of a digital to analog converter 34. The output of the digital to analog converter 34 is electrically coupled to the input of an amplifier 35. The output of the amplifier 35 is electrically coupled to the input of a speaker 24. A "beep" will sound through the speaker 24 each time a count is entered into the counter 33.

In another embodiment the hand-held marking device 10 may include an on/off button which is placed in the same position where the reset switch 22 is placed in the first embodiment. The on/off button has four sequential functions. The first push turns on the hand-held marking device 10 with the display 23 the screen of which displays a —0— and the beeper indicator symbol on the screen of the display 23. The second push resets the counting circuit 21 to —0— and clears a memory. The third push silences the beeper even though the counting circuit 21 continues to function. The fourth push turns the power of the hand-held marking device 10 off completely. If during the course of counting the user takes a break of ten or more minutes without turning off the hand-held marking device 10 the screen of the display 23 will clear, but the counting circuit 21 will retain the number of items counted in the memory. One push of the on/off button will return the hand-held marking device 10 to the first function mode of use and the screen of the display will again display the number retained in the memory with the sequential functions now operating as if no break had occurred.

In still another embodiment the hand-held marking device 10 may include a second button which is disposed adjacent to the on/off button and which is designated as the +M button. The hand-held marking device 10 has additional circuitry for use in conjunction with the second button in order to allow the all of items counted to be summed and held in a memory. When the user presses the second, or +M, counting circuit 21 adds the number displayed on the screen of the display 23 to the number presently held in the memory and displays new number in memory total on the screen of the display 23 with an accompanying memory indicator, such as +M. The counting circuit 21 cannot continue counting until the on/off button is pressed once which returns the last counted number on the screen of the display 23. The counting circuit 21 can continue adding the count to the display number or by pressing the on/off button twice the counting circuit 21 will be reset to —0—. Pressing the +M button once while the —0— is displayed will display the number to be held in the memory. Pressing the +M button twice while the —0— is displayed will reset the memory and the counting circuit 21 cannot continue until the on/off button is pressed once. The function of the on/off button can continue as described in either of the above embodiment.

From the foregoing it can be seen that a hand-held marking device for marking in order to count each item in a plurality of items, such as electrical outlets on an engineering drawing and to automatically record the count has been described. It should be noted that distances of and between the figures are not to be considered significant.

Accordingly it is intended that the foregoing disclosure and showing made in the drawing shall be considered only as an illustration of the principles of the present invention.

What is claimed is:

1. A hand-held marking device for marking in order to mark and count each of a plurality of items in a set and to automatically record the count, said hand-held marking device comprising:
   a. a casing;
   b. marking means for marking off each of the plurality of items, said mixing means being mechanically coupled to said casing;
   c. counting means for counting the number of marked items said counting means being mechanically coupled to said casing;
   d. switching means for providing an input pulse to said couting means, said switching means being mechanically coupled to said counting means;
   e. a circuit board which has a first terminal, which is electrically coupled to said counting means, and a second terminal, which is electrically coupled to said switching means, and which is disposed within and mechanically coupled to said casing.
   f. displaying means for displaying the number of counted items, said displaying means being electrically coupled to said counting means and mechanically coupled to said casing;
   g. resetting means for resetting said counting means, said resetting means being mechanically coupled to said casing and also being electrically coupled to said counting means whereby said hand-held marking device counts each item from the set and displays the number of items counted.

2. A marking device for marking and counting each of a plurality of items according to claim 1 wherein said marking means comprises a cartridge with a marking tip at one end and a plunger at the other end, said cartridge being slidably coupled within said casing so that said plunger engages said switching means when said marking tip contact a surface.

3. A marking device for marking and counting each of a plurality of items according to claim 2 wherein said switching means comprises
   a. a first conductive plate;
   b. a first spring which is mechanically coupled to said circuit board and which is electrically coupled to said first conductive plate; and
   c. a second spring which is electrically coupled to said second terminal of said circuit board wherein said cartridge is slidably coupled within said casing so that said first conductive plate engages said second conductive plate; and
   d. a second plate which is mechanically coupled to said second spring.

4. A marking device for marking and counting each of a plurality of items according to claim 2 wherein said switching means comprises a pressure sensitive switch which is electrically coupled between said first and second terminals of said circuit board wherein, when the user applies pressure to said marking means, said cartridge activates said pressure sensitive switch.

* * * * *